US006618159B1

(12) United States Patent
Tobita et al.

(10) Patent No.: US 6,618,159 B1
(45) Date of Patent: Sep. 9, 2003

(54) METHOD OF SWITCHING PRINT MODES OF PRINTING DEVICE

(75) Inventors: Satoru Tobita, Hitachinaka (JP); Yoshikane Matsumoto, Hitachinaka (JP); Hideaki Mamiya, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 09/410,015

(22) Filed: Oct. 1, 1999

(30) Foreign Application Priority Data

Oct. 2, 1998 (JP) ........................................ P10-280717

(51) Int. Cl.[7] ................................................ G06K 15/00
(52) U.S. Cl. ........................................ 358/1.13; 358/1.5
(58) Field of Search ........................... 358/1.1, 1.2, 1.5, 358/1.6, 1.9, 1.13, 474, 401; 380/75, 85, 82; 346/44, 49, 51; 400/708, 50, 51, 17

(56) References Cited

U.S. PATENT DOCUMENTS 4,554,556 A * 11/1985 Hirata et al. .................. 346/49
5,263,994 A * 11/1993 Ueda ....................... 400/157.3

* cited by examiner

*Primary Examiner*—Arthur G. Evans
(74) *Attorney, Agent, or Firm*—Whitham, Curtis & Christofferson, PC

(57) ABSTRACT

When print mode of a printing device is switched to a print mode with a higher print speed, after the direction of shuttle movement is reversed, a time duration that driving current is applied to a reversing coil is increased, so that shuttle speed is increased to a target speed. A time duration that driving current is applied to a constant velocity coil is decreased accordingly. On the other hand, when the print mode is switched to a print mode with a lower print speed, the time duration that driving current is applied to the reversing coil is decreased, and the time duration that driving current is applied to the constant velocity coil is increased accordingly. In this way, the print modes of the printing device can be switched quickly without stopping printing operations, thereby enhancing throughput.

8 Claims, 12 Drawing Sheets

1000, NORMAL TEXT PRINT REGION
2000, OCR TEXT PRINT REGION
3000, BAR-CODE PRINT REGION
5000, RECORDING SHEET

METHOD OF SWITCHING PRINT MODES OF PRINTING DEVICE

BACKGROUND OF THE INVENTION

1. Field of the Invention

The present invention relates to a method of switching print modes of a printing device that as a plurality of different print modes for printing at different speeds.

2. Description of the Related Art

There has been known a print device including a hammer bank that is reciprocally transported to form an image on a recording medium, such as a recording sheet. Dot line printers and shuttle printers are representative examples of such print devices. Several types of shuttle mechanisms are known for reciprocally transporting the hammer bank. For example, one type of mechanism is provided with a cam or a link mechanism for converting rotational drive of a drive motor into linear movement. Another type of mechanism reverses the transport direction of the hammer bank by changing rotational direction of a drive motor. There is also known a direct drive type mechanism including a linear motor. The direct drive type mechanism requires no transmission mechanism for transmitting drive of the linear motor to the hammer bank.

FIG. 1 shows an example of a printing unit of a print device. In FIG. 1, the printing unit 1 includes a shuttle mechanism 2, a hammer bank 3, a sensor 4, and a shuttle drive mechanism. The shuttle mechanism 2 includes a guide shaft 11, direct drive bearings 12, a linear motor 20, and an inversion mechanism 30. The shuttle drive mechanism includes a controller 50, a shuttle control circuit 60, and a shuttle drive circuit 70. The guide shaft 11 extends leftward and rightward as viewed in FIG. 1. The direct drive bearings 12 are reciprocally movably mounted on the guide shaft 11. The hammer bank 3 is supported on the direct drive bearings 12, and so is reciprocally movable with the direct drive bearings 12. Although not shown in the drawings, the hammer bank 3 is provided with a plurality of printing hammers for forming a dot pattern on a recording medium based on print data received from an external device. The linear motor 20 is provided with a coil 21 and magnets (not shown), and is driven in a well known manner. Although not shown in the drawings, the coil 21 includes a reversing coil and a constant velocity coil. The inversion mechanism 30 has a pair of timing pulleys 32 and a timing belt 31 wound around the timing pulleys 32. The coil 21 is connected to the direct drive bearings 12 via the inversion mechanism 30. With this configuration, the drive force of the linear motor 20 is transmitted to the direct drive bearings 12 so as to reciprocally transport the direct drive bearings 12. The coil 21 is also reciprocally transported in synchronization with the direct drive bearings 12, but always in a direction opposite to the direction in which the direct drive bearings 12 are transported. In this way, the coil 21 serves as a counter balance. That is, when the direct drive bearings 12 with the hammer bank 3 mounted thereon are reciprocally transported, such a reciprocal movement of the coil 21, which has a fixed weight, achieves leftward and rightward weight balance of the print device, thereby reducing vibration generated on the print device due to the transport of the direct drive bearings 12.

The sensor 4 is provided near a movable portion, which in the present example is on the hammer bank side, for detecting a position of the hammer bank 3. The shuttle drive circuit 70 energizes the coil 21 by supplying an driving current, and the shuttle control circuit 60 controls the amount of driving current supplied to the coil 21. Based on positional information supplied by detection by the sensor 4, the controller 50 controls the shuttle control circuit 60 and the shuttle drive circuit 70 to move the hammer bank 3 in a predetermined shuttle speed pattern which is graphically shown in FIG. 3. The controller 50 also receives a variety of signals from an external device (not shown).

FIG. 2 shows a sheet transport mechanism 80 provided to the printing unit 1. A platen 81 is rotatably supported on a printer frame (now shown). A pair of left and right pin tractors 82 are provided for transporting a sheet S on the platen 81 in a direction perpendicular to the reciprocal movement direction of the hammer bank 3. The platen 81 and the pin tractor 82 are driven by a sheet feed motor 83. An ink ribbon 84 is provided for supplying ink.

As shown in FIG. 3, a region of the reciprocal movement of the hammer bank 3 (reciprocal movement of the hammer bank 3 will be referred to as "shuttle" hereinafter) includes a constant velocity region and reversing regions. In the constant velocity region, the constant velocity coil is energized so the shuttle moves at a constant speed. On the other hand, in the reversing regions, the reversing coil is energized, so the shuttle accelerates or decelerates. When the shuttle enters the reversing region from the constant velocity region, the shuttle gradually decelerates, and the velocity of the shuttle reaches zero at a reversing position P0. Then, the movement direction of the shuttle is reversed. The shuttle gradually accelerates in the opposite direction until the shuttle again enters the constant velocity region.

Depending on the type of character to be printed, some printing devices switch print modes with different print speeds. For example, a high speed print mode is used for printing normal characters at a high print speed. The high print speed in the high speed print mode is achieved by sacrificing quality of printed characters, which is determined by print dot density. On the other hand, a high quality print mode (i.e., a low speed print mode) is used for printing high-quality characters, such as bar codes images and OCR images. In the high quality mode, print speed is sacrificed for increased print dot density.

Conventionally, there have been two different methods for changing print speeds during printing operations upon switching print modes. According to a first method, the printing operations and the shuttle are both temporarily stopped. Then, the shuttle is restarted. Once a target shuttle speed is attained, printing operations are restarted. On the other hand, according to a second method, shuttle is continued while printing operations are temporarily stopped. Then, the value of the driving current supplied to the coil 21 is gradually changed, thereby gradually changing the shuttle speed. Once the target shuttle speed is obtained, then printing operations are restarted.

It should be noted that the series of operations for gradually changing the shuttle speed until a target speed is attained are called initialization operations.

Different accelerations and decelerations of the shuttle in the reversing regions may be used depend on the print speed. Also, the reciprocal movement distance of the shuttle may also be varied depending on print speed to enhance stability of control. When the reciprocal movement distance is changed, there is need to temporarily stop the shuttle, move the hammer bank 3 to an objective reversing position, and then restart the shuttle.

Also, in order to improve speed of printing operations, there has been proposed a printing device with a different configuration. For example, a printing device 1' shown in FIG. 4 is substantially the same as the printing device 1, but the shuttle movement is controlled using the constant velocity coil and springs 40 without using the reversing coil. The springs 40 are provided at both ends of the guide shaft 11 and at both ends of the coil 21 for urging the hammer bank 3 and the coil 21.

Next, control of the shuttle movement in the printing device 1' will be described. In the constant velocity region, an driving current is supplied to the constant velocity coil, thereby attaining shuttle of a constant velocity. When the hammer bank 3 enters the reversing region, application of the driving current to the constant velocity coil is stopped. The shuttle gradually decelerates while pressing the spring 40, and the velocity of the shuttle reaches zero at a reversing point. The direction of the velocity is then reversed, and shuttle accelerates in the opposite direction because of the urging force of the compressed spring 40. Upon entering the constant velocity region, the driving current is supplied to the constant velocity coil, and shuttle restarts at a constant speed.

The shuttle speed in the printing device 1' is changed using the initialization operations. Specifically, upon receiving a print mode switching signal, printing operations are temporarily stopped while the shuttle movement is maintained. When switching from the low speed print mode to the high speed print mode, as shown in FIG. 5, the value of the driving current applied to the constant velocity coil is increased at the end of the constant velocity region. This increases the shuttle speed, and hammer bank 3 presses the spring 40 with an increased energy. As a result, repulsive force of the spring 40 is increased, thereby increasing the shuttle speed. This operation is repeated until the shuttle speed reaches an objective speed. Upon attaining the objective speed, the value of the driving current to the constant velocity coil is leveled, and the printing operations are restarted.

On the other hand, when switching from the high speed print mode to the low speed print mode, the value of the driving current at the end of the constant velocity region is decreased, thereby decreasing repulsive force of the spring 40. Then, the shuttle speed is gradually decreased until an objective shuttle speed is attained.

The reason for temporally stopping the printing operations during the initialization operations is that overshoot and variation on the shuttle speed occur due to unstable shuttle movement during the initialization operations. Overshoot indicates a situation where the shuttle speed increases to an excessively high speed for an instant at the beginning of the constant velocity region.

FIG. 6 shows a print pattern 100 printed on a recording sheet 5000. The print pattern 100 includes a normal text print region 1000, an OCR text print region 2000, and a bar-code print region 3000. All characters and text included in the print pattern 100 can be printed at the same print speed. However, in order to increase overall print speed, first the print of the normal text print region 1000 is completed in the high speed print mode, and then the print mode is switched to the low speed print mode using one of the above-described conventional methods. Then, the OCR text print region 2000 and the bar-code text print region 3000 are printed in the low speed print mode.

However, switching the print modes takes time when the shuttle must be temporarily stopped or initialization operations must be performed. Therefore, when only a small portion of the total print amount is printed in the high speed print mode, the overall print speed can even be reduced to slower than if only the low speed print mode was used.

SUMMARY OF THE INVENTION

It is objective of the present invention to overcome the above-described problems and also to provide a control method for quickly switching print modes of a printing device without stopping printing operations, thereby enhancing throughput of the printing device.

It is another objective of the present invention to provide a control method capable of improving throughput by continuing printing operations during initialization operations.

In order to achieve the above and other objectives, there is provided a switching method of switching print modes of a printing device including a print mechanism for performing printing operations while reciprocally moving relative to a recording medium. The reciprocal movement of the print mechanism is controlled using a coil including a reversing coil and a constant velocity coil. The switching method includes the steps of a) performing printing operations in a first print mode while reciprocally moving the print mechanism by applying a first driving current to the coil, b) receiving a signal indicating to switch from the first print mode to a second print mode different in a printing speed from the first print mode, and c) changing the first driving current to a second driving current to the coil to thereby switch from the first print mode to the second print mode, the printing operations and reciprocal movement of the print mechanism being continued during switching of the print mode.

There is also provided a switching method of switching print modes of a printing device including a print mechanism for performing printing operations while reciprocally moving relative to a recording medium. The reciprocal movement of the print mechanism is controlled using a constant velocity coil and an urging mechanism. The switching method includes the steps of a) performing printing operations in a first print mode while reciprocally moving the print mechanism by applying a first driving current to the constant velocity coil, b) receiving a signal indicating to switch from the first print mode to a second print mode different in a print speed from the first print mode, and c) if the first print mode is a low speed print mode and the second print mode is a high speed print mode, changing the first driving current to a second driving current, thereby switching from the first print mode to the second print mode, the printing operations and reciprocal movement of the print mechanism being continued during switching of the print mode.

BRIEF DESCRIPTION OF THE DRAWINGS

The particular features and advantages of the invention as well as other objects will become more apparent from the following description taken in connection with the accompanying drawings, in which.

DETAILED DESCRIPTION OF THE PREFERRED EMBODIMENT

Next, an explanation will be provided for methods of controlling the shuttle in the printing device 1 according to the present invention. It should be noted that the configuration of the printing device 1 is the same as that described in the prior art section of this application, so its description will be omitted to avoid duplication of description.

First, a shuttle control for switching from a print mode to another print mode with a different print speed during printing operations will be described while referring to FIG. 7. This explanation will be provided for the situation when the print mode is switched from the low speed print mode to the high speed print mode using the same reciprocal movement distance and acceleration rate.

Figure 7:
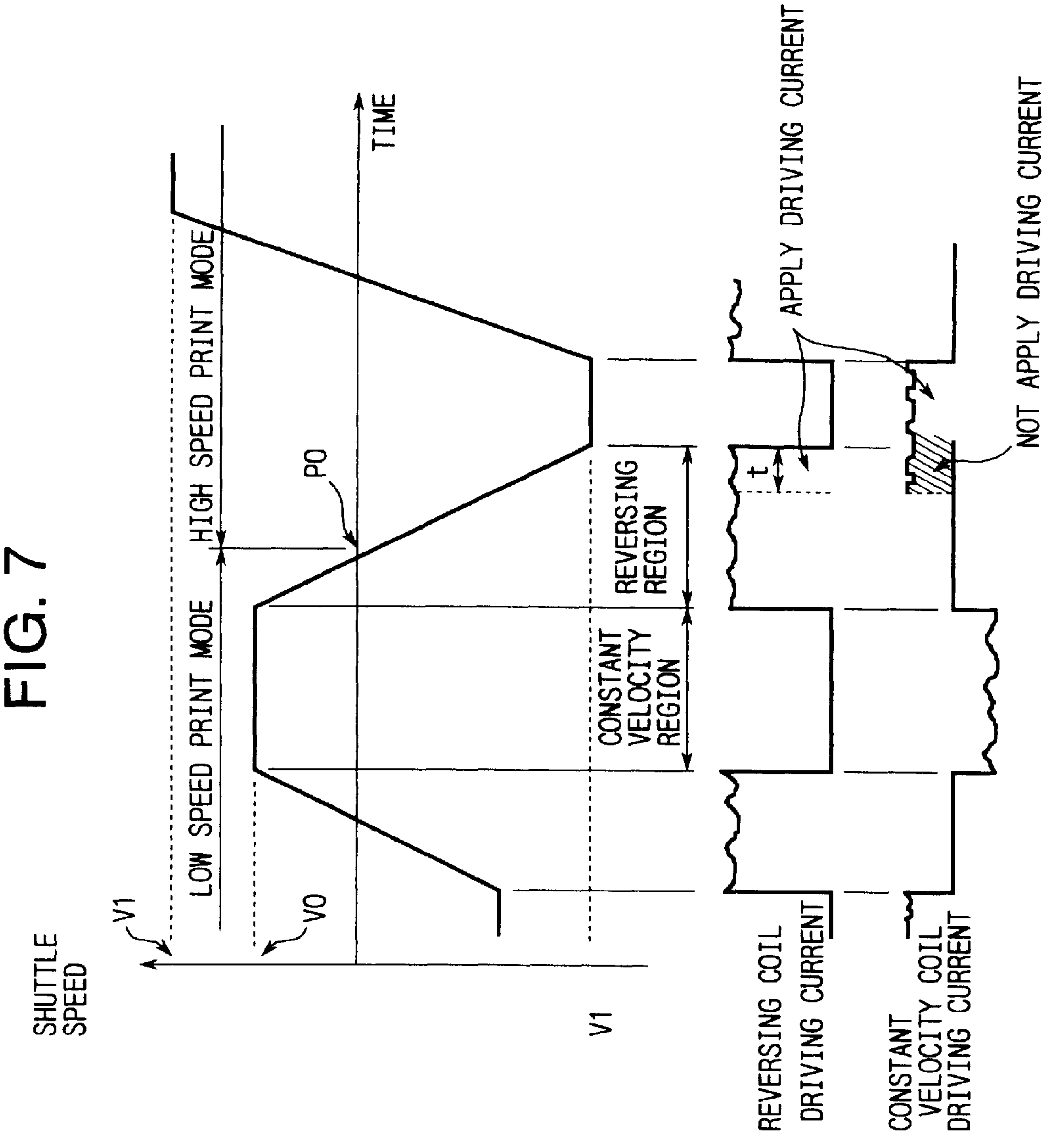
FIG. 7 is a timing chart snowing an example of print mode switching operations for switching shuttle speed according to the present invention.

As shown in FIG. 7, the shuttle speed within the constant velocity region is set to a speed V0 in the low speed print mode. After the shuttle control circuit 60 receives a print mode switching signal to switch to the high speed print mode, the direction of shuttle movement is next reversed at the reversing position P0. Then, the time that the driving current is supplied to the reversing coil is increased by a time t, so that the shuttle speed reaches a speed V1, whereupon shuttle continues at a constant velocity. Because the reversing region is increased by time t, the constant velocity regions should be shortened accordingly. By changing the time duration for applying the driving current to the reversing coil and the constant velocity coil, the print mode can be switched quickly without temporarily stopping the shuttle or performing initialization operations.

When the print mode is changed from the high speed print mode to the low speed print mode, control operations can be performed based on the same control theory. That is, the time that of driving current is applied to the reversing coil is reduced, and the time that driving current is applied to the constant velocity coil is increased.

Figure 8:
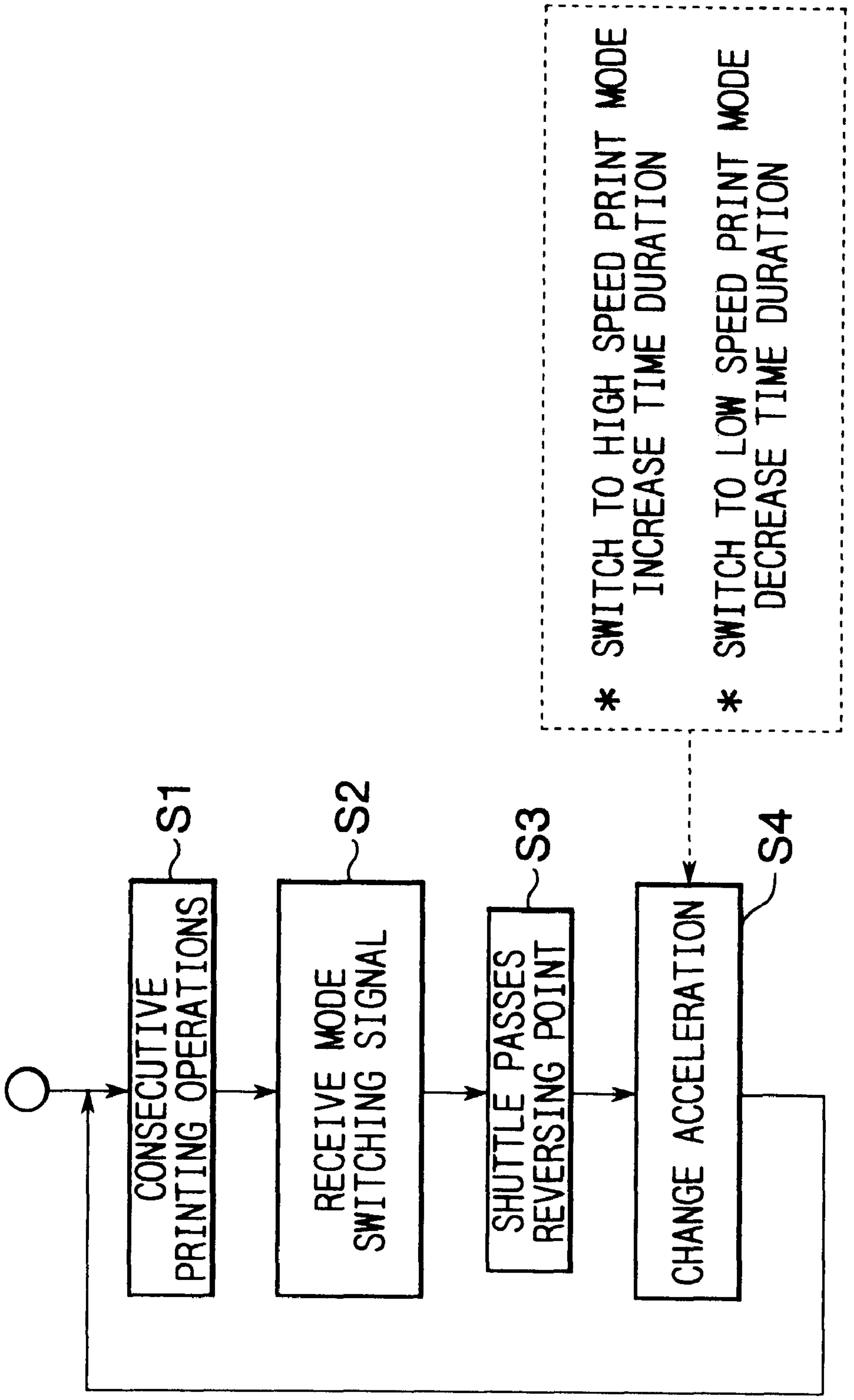
FIG. 8 is a flowchart showing operations for the print mode switching operations of FIG. 7.

Next, the control program of the above-described shuttle control will be described while referring to the flowchart shown in FIG. 8.

While the printing operations are being consecutively performed in a print mode (S1), the shuttle control circuit 60 receives a print mode switching signal (S2). After the shuttle passes the reversing position, that is, the first time after having received the print mode switching signal (S3), then the times that driving current is applied to the reversing coil and to the constant velocity coil are changed (S4). At this time, if the print mode switching signal is for switching from the low speed print mode to the high speed print mode, then the time duration for applying driving current to the reversing coil is increased, and the time duration for applying driving current to the constant velocity coil is decreased. Contrarily, if the print mode switching signal is for switching from the high speed print mode to the low speed print mode, then the time duration for applying driving current to the reversing coil is decreased, and the time duration for applying the driving current to the constant velocity coil is increased.

Next, a shuttle control for switching from one print mode to another print mode, both with different print speeds and different reciprocal movement distances, during printing operations will be described while referring to FIG. 9. This explanation will be provided for an example of when the low speed print mode is switched to the high speed print mode with a greater reciprocal movement distance and the same acceleration rate.

Figure 9:
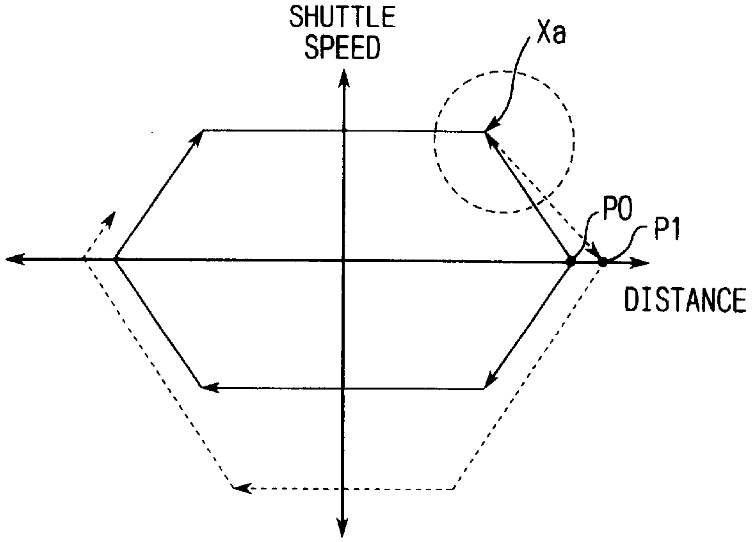
FIG. 9 is a timing chart showing an example of print mode switching operation for switching shuttle movement distance according to the present invention.

As shown in FIG. 9, after the shuttle passes by a deceleration start position Xa the first time after receiving a print mode switching signal, the value of the driving current applied to the reversing coil is reduced. This decreases the deceleration rate of the shuttle from a rate $\alpha 1$ to a rate $\alpha 2$, and a time duration required for the shuttle to decelerate increases. As a result, the shuttle travels a greater distance and reaches a reversing point P1. In this way, the reversing position of the shuttle can be changed from the position P0 to the position P1. Then, the shuttle is controlled according to the high speed print mode so that the shuttle follows a path indicated by a broken line in FIG. 9. In this way, printing operations in the high speed print mode can be quickly performed.

The same principle can be applied when switching from the high speed print mode to the low speed print mode with a smaller reciprocal movement distance. That is, after the shuttle passes by a deceleration start position Xa the first time after receiving a print mode switching signal, the value of the driving current applied to the reversing coil is increased, so that the deceleration rate is increased. After the shuttle reverses, printing operations in the low speed print mode are performed.

Figure 10:
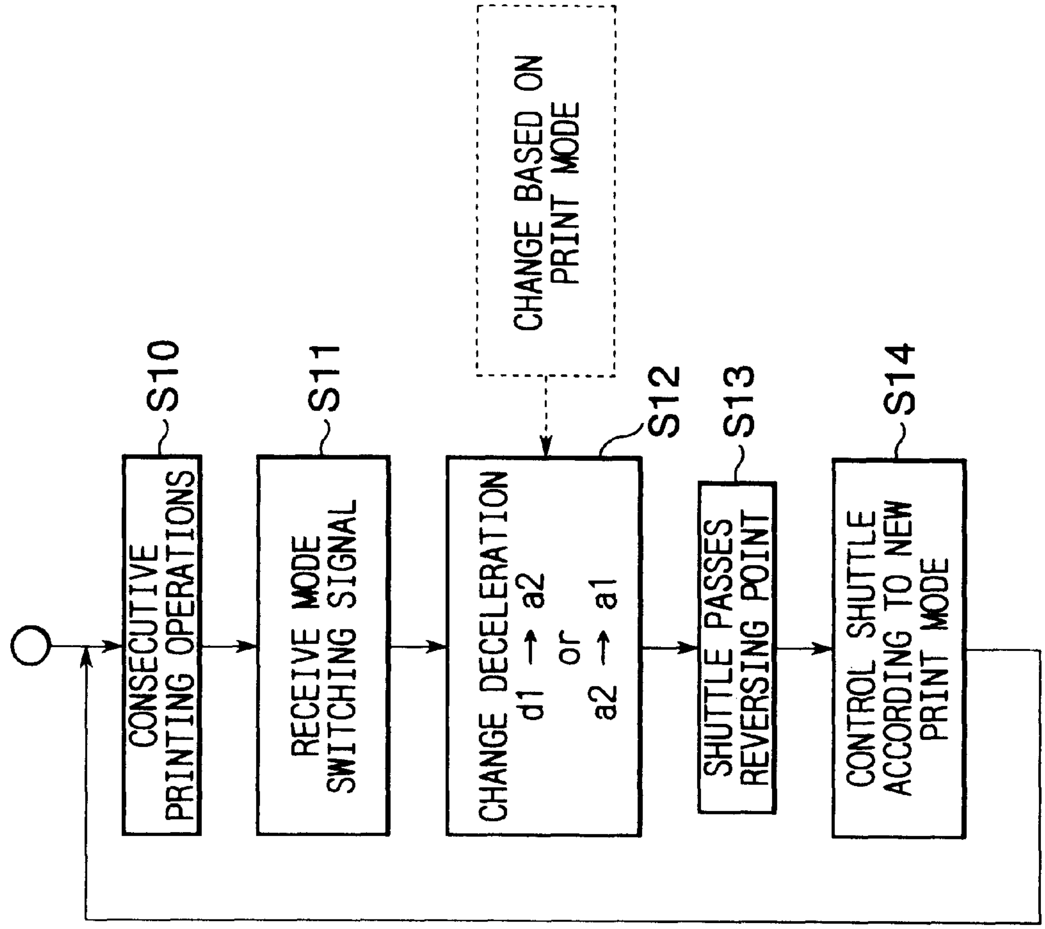
FIG. 10 is a flowchart showing operations for the print mode switching operations of FIG. 9.

Next, a control program for the above-described shuttle control will be described while referring to the flowchart shown in FIG. 10.

While printing operations are consecutively being performed in a certain print mode (S10), the shuttle control circuit 60 receives a print mode switching signal (S11) After the shuttle passes by the deceleration start position Xa the first time after receiving the signal, the values of the driving current applied to the reversing coil is switched according to the print mods switching signal (S12). That is, if the print mode switching signal is for switching to the print mode with a greater reciprocal movement distance, the value or the driving current is decreased. On the other hand, is the print mode switching signal is for switching to a print mode with a smaller reciprocal movement distance, the value of the driving current is increased. Next, after the shuttle passes by the reversing position (S13), then the shuttle is controlled according to the new print mode (S14).

Next, a shuttle control for switching from a print mode to another, both with different print speeds and different acceleration rates will be described while referring to FIG. 11. This explanation will be provided for the situation wherein a low speed print mode is switched to a high speed print mode with a greater acceleration rate and the same reciprocal movement distance.

Figure 11:
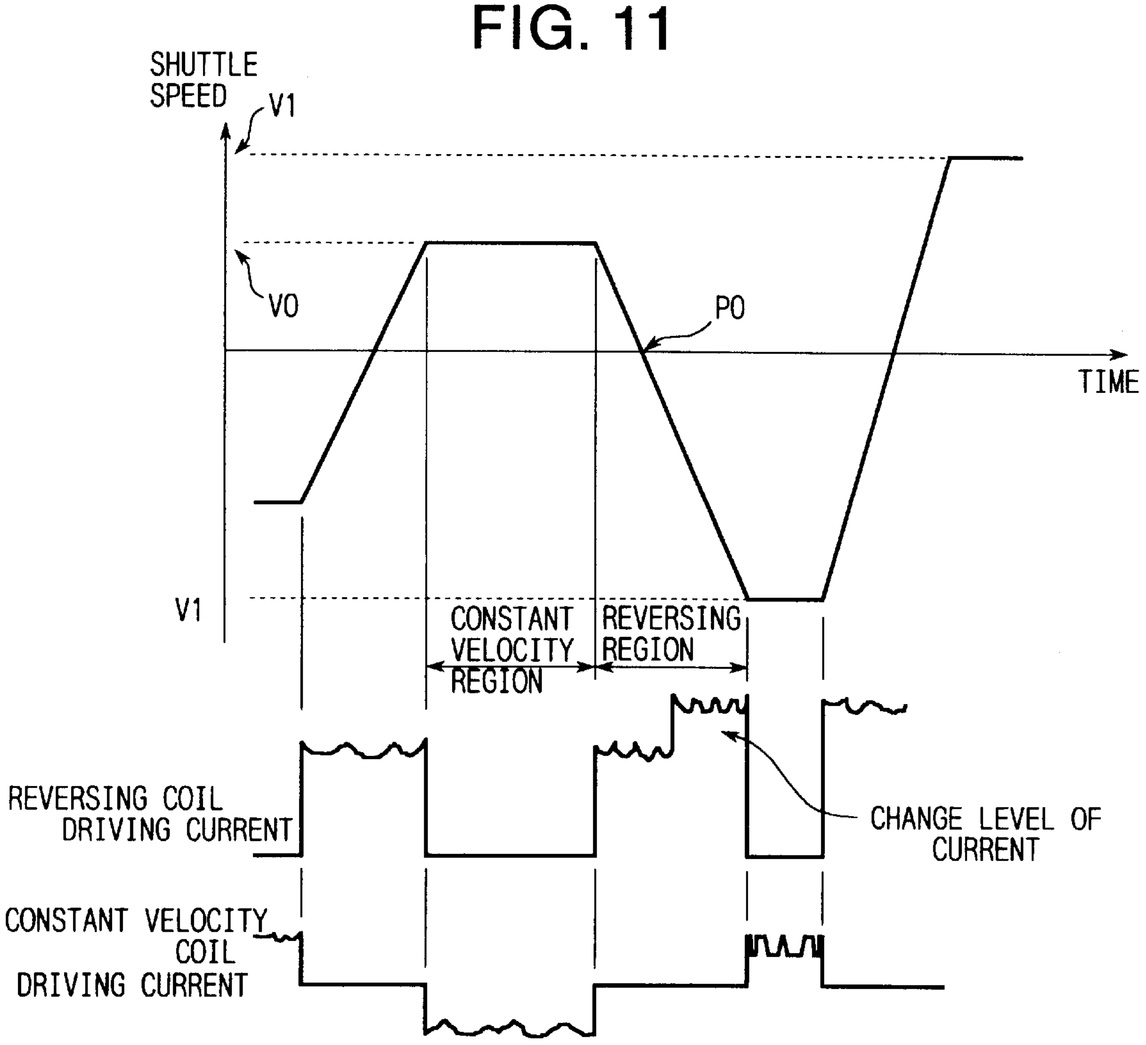
FIG. 11 is a timing chart showing an example of print mode switching operation for switching acceleration rate according to the present invention.

In FIG. 11, directly after the shuttle reverses at the reversing position P0, that is, the first time after receiving a print mode switching signal, the value of the driving current applied to the reversing coil is increased. As a result, the shuttle accelerates at an increased acceleration rate and reaches a target shuttle speed V1. In this way, immediately after the shuttle reverses at the reversing position P0, the print mode can be changed to the high speed print mode.

The same principle can be applied for when the print mode is switch to the low speed print mode with a smaller acceleration rate. That is, directly after the shuttle reverses at the reversing position P0 the first time after receiving a print mode switching signal, the value of the driving current applied to the reversing coil is reduced. Then, the shuttle can be controlled according to the low speed print mode.

Figure 12:
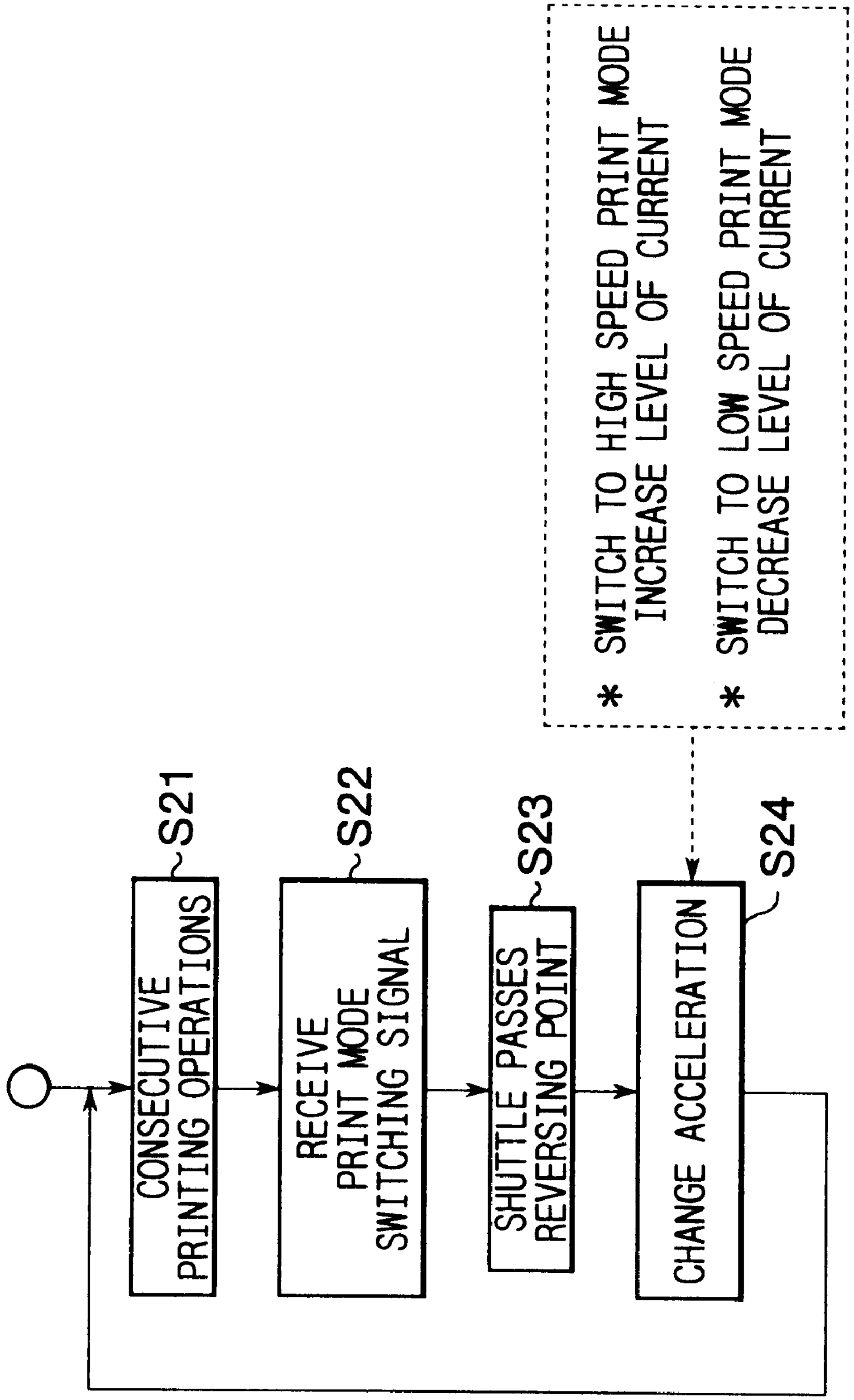
FIG. 12 is a flowchart showing operations to perform the print mode switching operations of FIG. 11.

Next, a control program of the above-described shuttle control will be described while referring to the flowchart shown in FIG. 12.

While printing operations are consecutively being performed in a certain print mode (S21), a print mode switching signal is received (S22). Then, after the shuttle passes by the reversing position P0 the first time after receiving the print mode switching signal (S23), the value of the driving current applied to the reversing coil is changed (S24). At this time, the driving current value is reduced when the acceleration rate is to be reduced, and the driving current value is increased when the acceleration rate is to be increased. As a result, acceleration rate is changed a needed.

Figure 1:
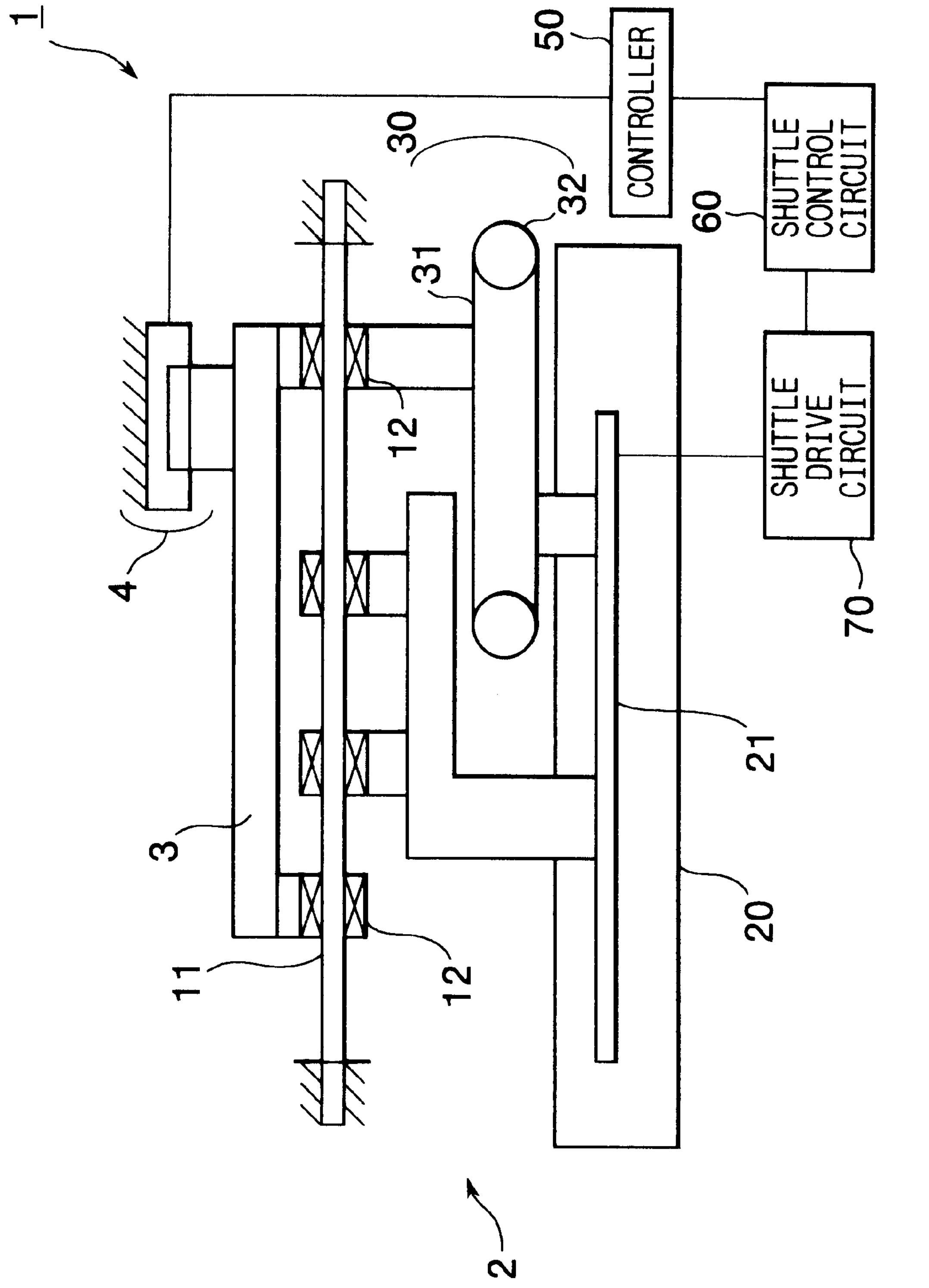
FIG. 1 is a front view showing configuration of a reciprocal movement mechanism of a printing device.
Figure 2:
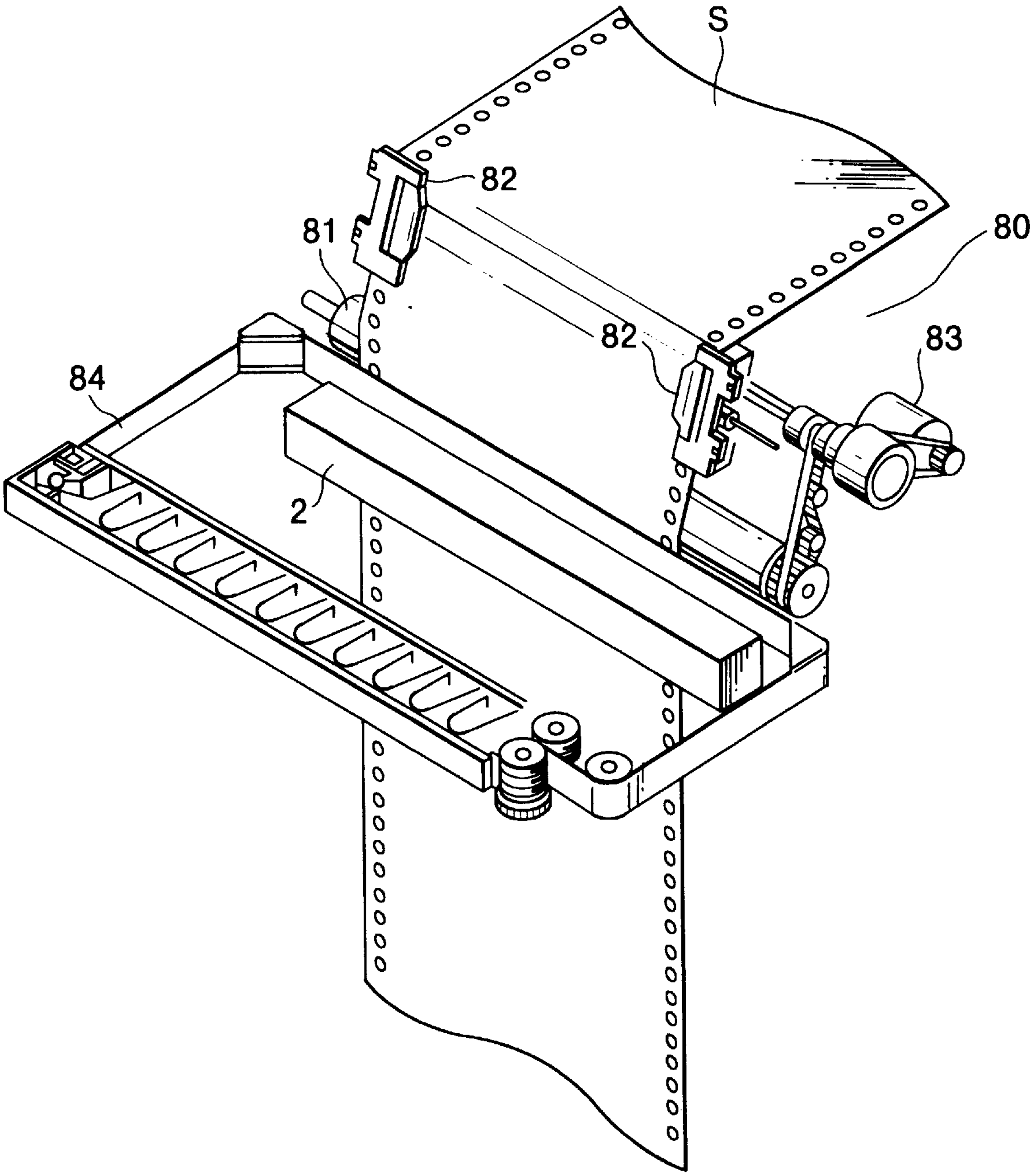
FIG. 2 is a perspective view showing the printing device of FIG. 1.
Figure 3:
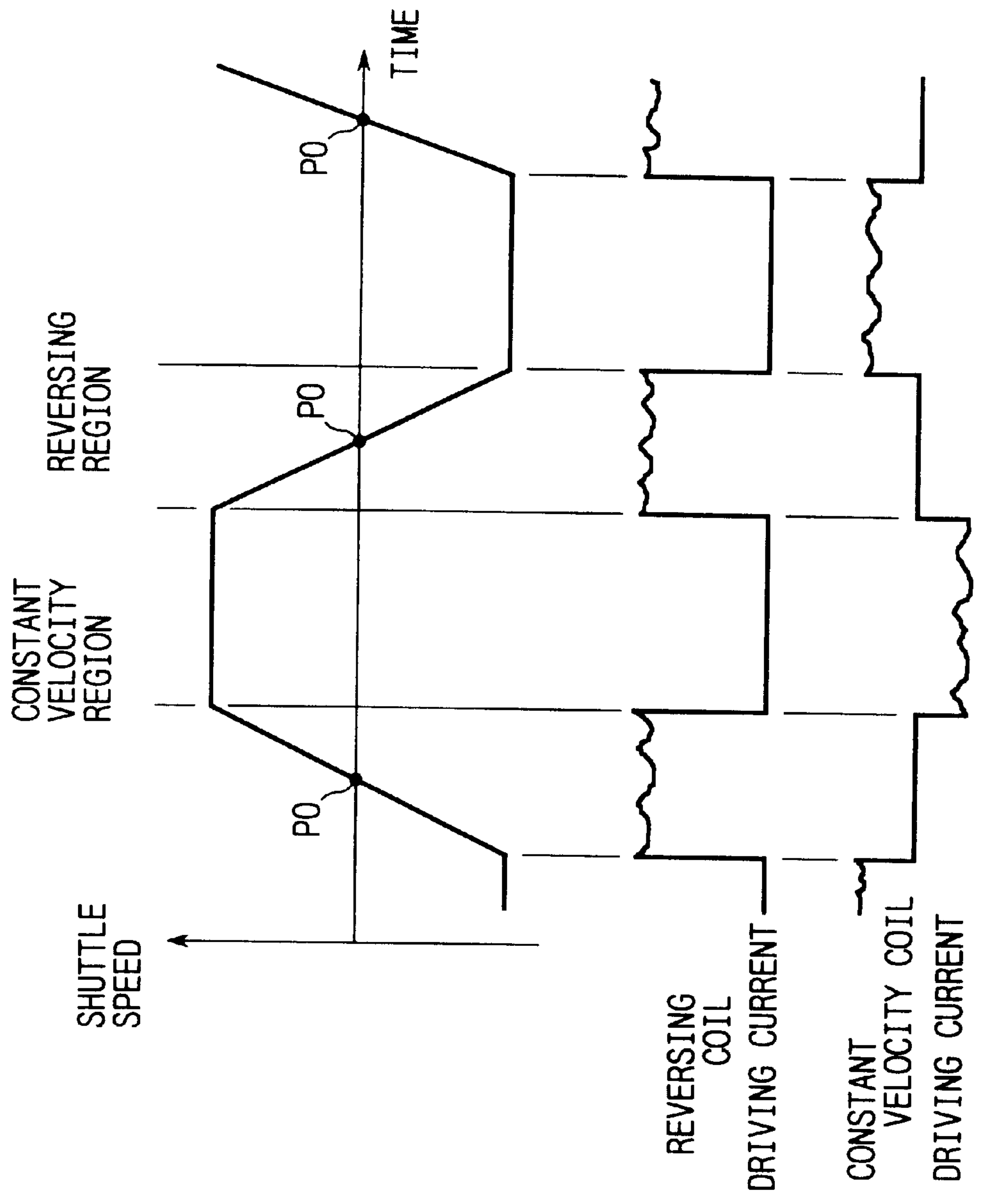
FIG. 3 is a timing chart showing shuttle movement in the printing device of FIG. 1.
Figure 4:
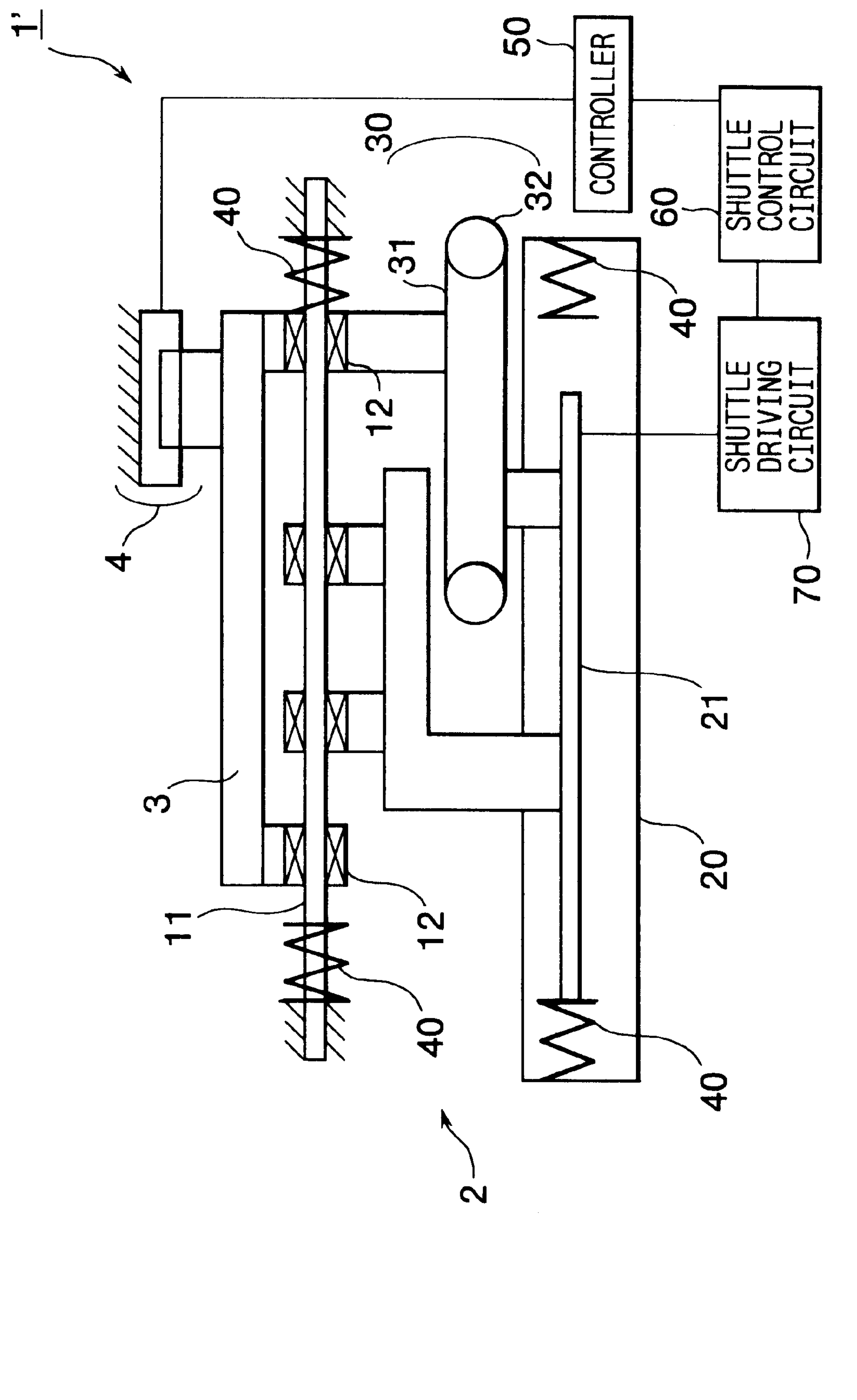
FIG. 4 is a schematic view showing configuration of a reciprocal movement mechanism of another printing device.
Figure 5:
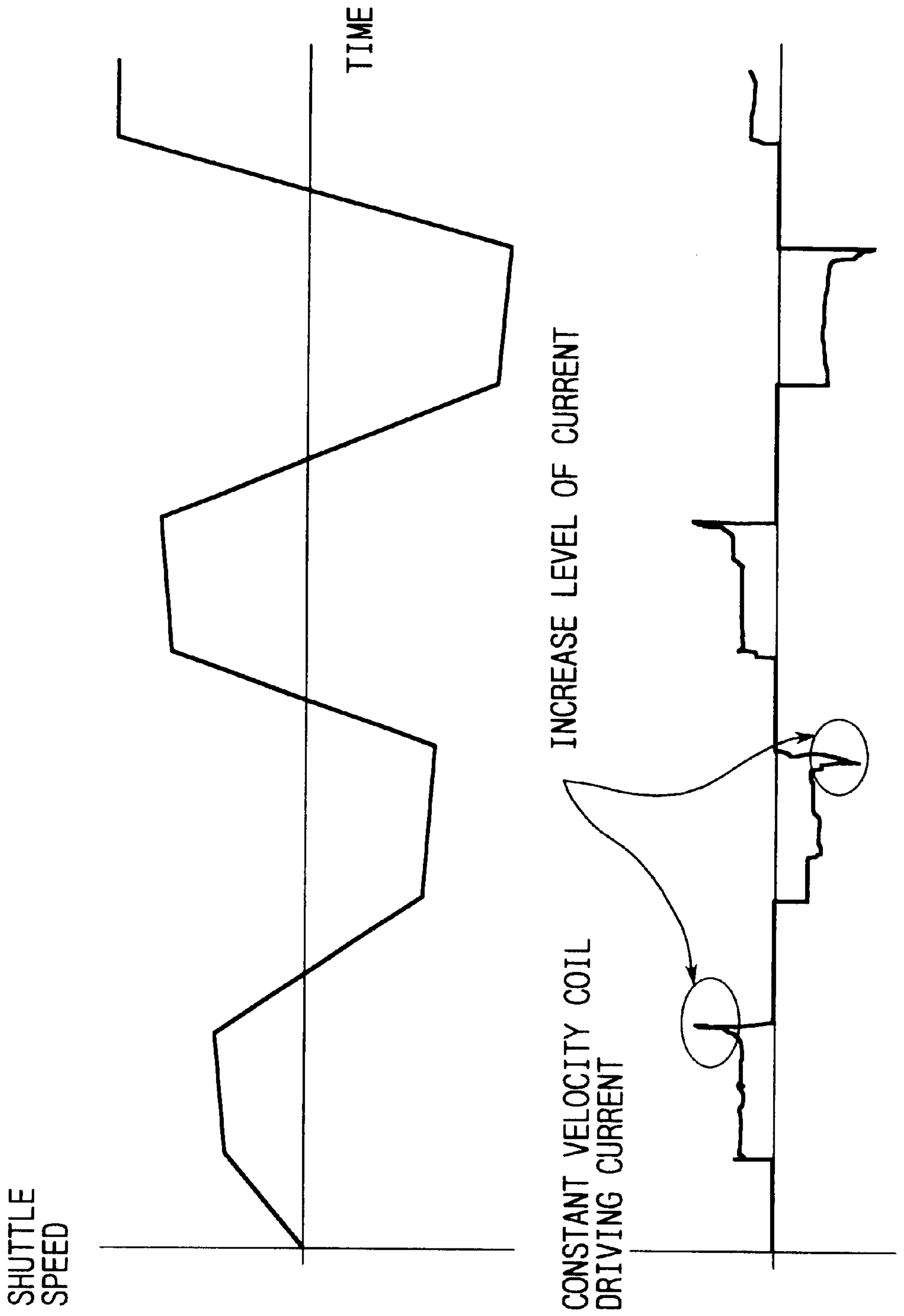
FIG. 5 is a timing chart showing shuttle movement of the printing device of FIG. 4.
Figure 6:
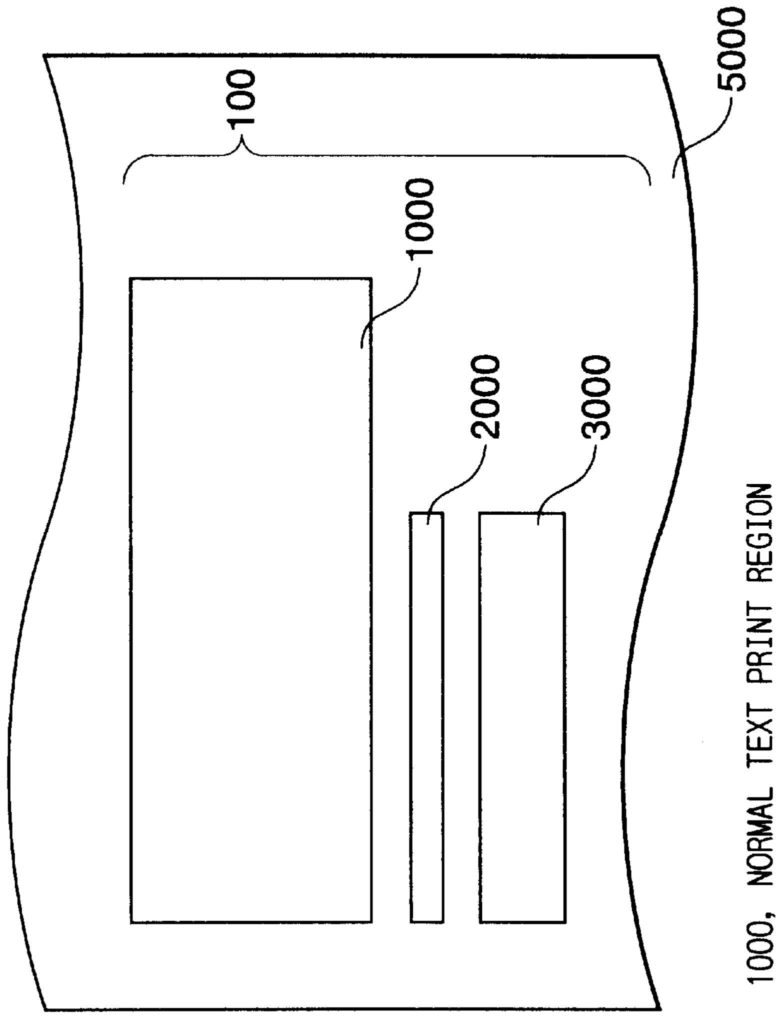
FIG. 6 is a schematic view showing an example of print patterns printed on a sheet.

As described above, according to the control methods of the present invention, the print mode can be switched instantaneously in synchronization with the shuttle reversal movement. Therefore, it is unnecessary to stop printing operations each time the print mode is switched. Accordingly, when print pattern 100 shown in FIG. 6 is printed, even though the high speed print mode is used only during a small portion of the overall printing amount, the throughput can be reliably enhanced compared to if the entire print pattern 100 is printed only in the low speed print mode.

Next, a control method of the shuttle movement of the printing device 1' will be described while referring to the flowchart shown in FIG. 13.

It should be noted that because the shuttle in the print device 1' is controlled using the springs 40 and the constant velocity coil without the reversing coil, the shuttle speed cannot be changed instantaneously contrary to the situation of the printing device 1. Therefore, the above-described control methods cannot be applied to the printing device 1'.

Figure 13:
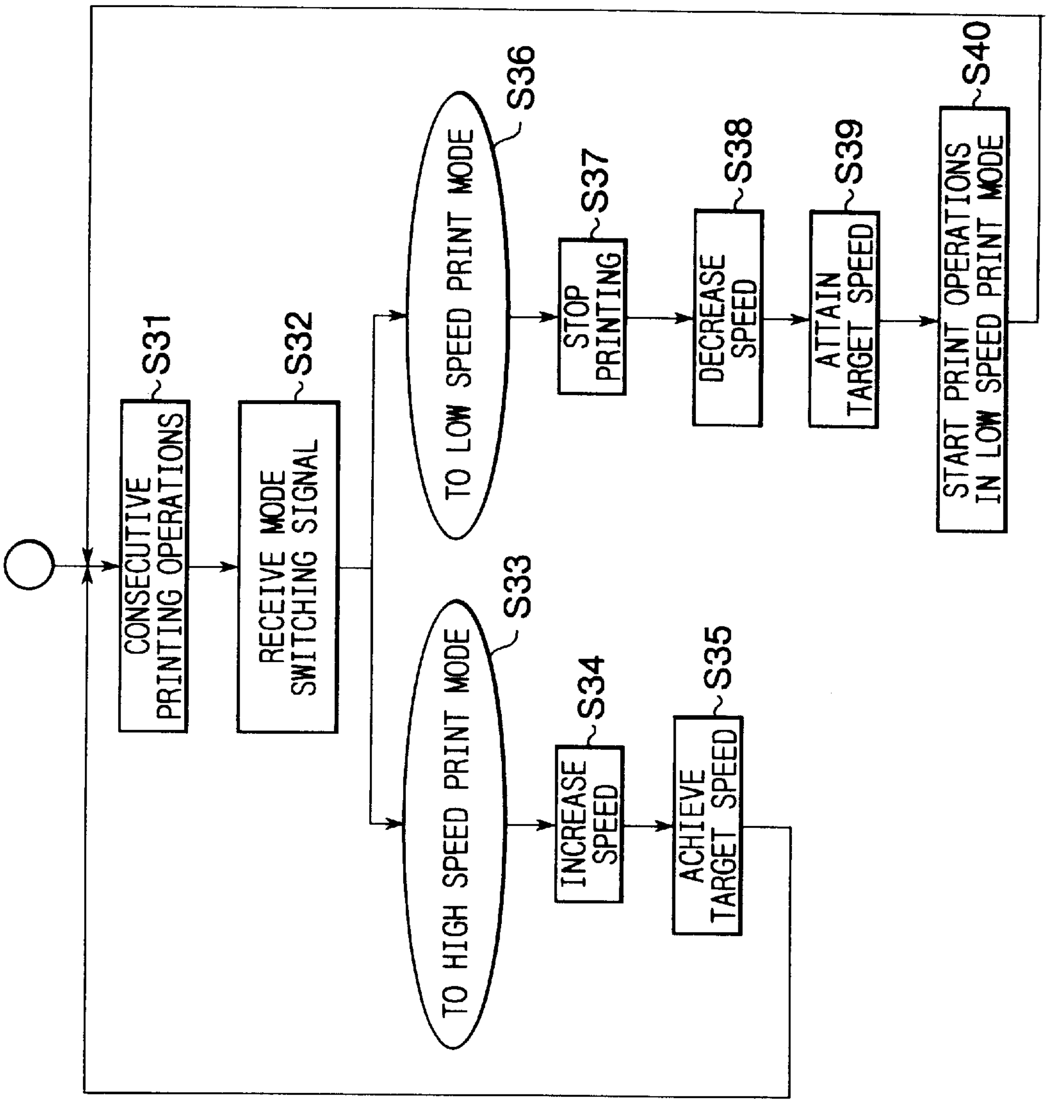
FIG. 13 is a flowchart showing operations to perform other print mode switching operations according to the present invention.

In FIG. 13, while printing operations are consecutively being performed in a print mode (S31), a print mode switching signal is received (S32), when the print mode switching signal is for switching the low speed print mode to the high speed print mode (S33), then the shuttle speed is gradually increased, that is, the initialization operations are started (S34). The initialization operations are performed basically in the same manner as the conventional initialization operations described above. However, according to the present invention, based on a shuttle speed detected by the sensor 4, the driving current supplied to the constant velocity coil is adjusted so as to stabilize the shuttle movement during the initialization operations. In this way, the shuttle speed is stabilized and overshoot is prevented, so that the printing operations can be continued even during the initialization operations. Then, the shuttle speed reaches a target speed within as short a time as possible (S35).

On the other hand, when the print mode switching signal is for switching to the low speed print mode (S36), the printing operations are temporarily stopped without stopping the shuttle (S37). Then, the shuttle speed is gradually decreased, that is, the initialization operations are started (S38). Upon achieving a target shuttle speed (S39), the printing operations are restarted in the low speed print mode (S40).

As described above, because the printing operation is not stopped when the print mode is switched to the print mode with a higher print speed, the throughput is enhanced.

Here, an explanation will be provided for why the printing operations need to be stopped when switching to a print mode with a lower print speed. To facilitate explanation, it will be assumed that a printing device has a low speed print mode for printing a 180 dpi image and a high speed print mode for printing a 90 dpi image. The time interval between two consecutive timing signals is set to a time T for the low speed print mode, and to a time T/2 for the high speed print mode. However, regardless of the print mode, the time interval between two consecutive timing signals is proportional to the shuttle speed. Print signals are outputted in synchronization with the timing signals. One print signal is outputted for each timing signal in the low speed print mode, and for every two timing signals in the high speed print mode.

The repeatability of the printing hammer is set equal to the time T. The repeatability is the round trip time required for the printing hammer of the hammer bank to move from an initial position toward a recording sheet to strike the recording sheet and print a dot, and then return back to the initial position. The repeatability is a constant value determined by the capability of the printing hammer, and is unrelated to the print mode. Because the repeatability is fixed, if the print signals are outputted faster than the repeatablilty, then the printing hammer will not be able to print quickly enough, so that printing cannot be performed.

When a print mode switching signal is received for changing from the high speed print mode to the low speed print mode, then, immediately the print signals are outputted in accordance with the low speed print mode, that is, one print signal is outputted for every timing signal. However, the shuttle speed is still near the high speed of the high speed print mode, so consecutive print signals will be separated by a time near T/2, and consequently shorter than the repeatability. Therefore, the print operations cannot performed until the shuttle speed is decreased to the target speed at which the print signals are outputted at a pitch equal to time T and consequently equal to the repeatability.

On the other hand, printing operations need not be stopped when changing from the low speed print mode to the high speed print mode because immediately after a print mode switching signal is received, a print signal is outputted for every tow timing signals in accordance with the high speed print mode. Although, at this point the shuttle speed has not yet increased to a target speed, consecutive timing signals are separated by an interval already large and consecutively larger than the repeatability. Therefore, printing operations can be continued.

While the invention has been described in detail with reference to specific embodiments thereof, it would be apparent to those skilled in the art that various changes and modifications may be made therein without departing from the spirit of the invention, the scope of which is defined by the attached claims.

What is claimed is:

1. A switching method of switching print modes of a printing device including a print mechanism for performing printing operations while reciprocally moving relative to a recording medium, wherein the reciprocal movement of the print mechanism is controlled using a coil including a reversing coil and a constant velocity coil, the switching method comprising the steps of:

a) performing printing operations in a first print mode while reciprocally moving the print mechanism by applying a first driving current to the coil;

b) receiving a signal indicating to switch from the first print mode to a second print mode different in a printing speed from the first print mode; and c) changing the first driving current to a second driving current to the coil to thereby switch from the first print mode to the second print mode, the printing operations and reciprocal movement of the print mechanism being continued during switching of the print mode.

2. The switching method according to claim 1, wherein in the step c) the first driving current is different from the second driving current in a current level, thereby changing acceleration and deceleration of reciprocal movement of the print mechanism.

3. The switching method according to claim 1, wherein in the stop c) a time duration that the first driving current is applied to the coil differs from a time duration that the second driving current is applied to the coil, thereby changing Speed of the reciprocal movement of the print mechanism.

4. The switching method according to claim 3, wherein in the step c) a time duration that the first driving current is applied to the reversing coil is longer than a time duration that the second driving current is applied to the reversing coil, and a time duration that the first driving current is applied to the constant velocity coil is shorter than a time duration that the second driving current is applied to the constant velocity coil, thereby increasing the speed of the reciprocal movement of the print mechanism.

5. The switching mechanism according to claim 3, wherein in the step c) a time duration that the first driving current is applied to the reversing coil is shorter than a time duration that the second driving current is applied to the reversing coil, and a time duration that the first driving current is applied to the constant velocity coil is greater than a time duration that the second driving current is applied to the constant velocity coil, thereby decreasing the speed of the reciprocal movement of the print mechanism.

6. The switching method according to claim 1, further comprising the step of d), after executing the step b), changing the first driving current to a third driving current different from the first driving current in a current level, thereby changing a region within which the print mechanism reciprocally moves.

7. A switching method of switching print modes of a printing device including a print mechanism for performing printing operations while reciprocally moving relative to a recording medium, wherein the reciprocal movement of the print mechanism is controlled using a constant velocity coil and an urging mechanism, the switching method comprising the steps of:

a) performing printing operations in a first print mode while reciprocally moving the print mechanism by applying a first driving current to the constant velocity coil;

b) receiving a signal indicating to switch from the first print mode to a second print mode different in a print speed from the first print mode; and c) if the first print mode is a low speed print mode and the second print mode is a high speed print mode, changing the first driving current to a second driving current, thereby switching from the first print mode to the second print mode, the printing operations and reciprocal movement of the print mechanism being continued during switching of the print mode.

8. The switching method according to claim 7, further comprising the step of d) if the first print mode is the high speed print mode and the second print mode is the low speed print mode, controlling the print mechanism to stop the printing operations and to continue the reciprocal movement, e) changing the first driving current to a third driving current to thereby increasing a speed or the reciprocal movement of the print mechanism to a target speed; and g) once the target speed is attained, starting printing operations in the second print mode.

* * * * *